United States Patent
Okamoto et al.

(10) Patent No.: US 7,457,779 B2
(45) Date of Patent: Nov. 25, 2008

(54) USER TERMINAL PROGRAM DESIGNATED NOT TO RECEIVE CONTENTS THAT CANNOT ACHIEVE USERS' OBJECT

(75) Inventors: Ryuichi Okamoto, Moriguchi (JP); Hideki Matsushima, Hirakata (JP); Masayuki Kozuka, Arcadia, CA (US)

(73) Assignee: Panasonic Corporation, Osaka (JP)

( * ) Notice: Subject to any disclaimer, the term of this patent is extended or adjusted under 35 U.S.C. 154(b) by 272 days.

(21) Appl. No.: 11/218,536

(22) Filed: Sep. 6, 2005

(65) Prior Publication Data
US 2005/0289069 A1 Dec. 29, 2005

Related U.S. Application Data

(60) Division of application No. 10/111,092, filed on Apr. 22, 2002, now abandoned, which is a continuation-in-part of application No. 09/649,029, filed on Aug. 28, 2000, now Pat. No. 6,336,028.

(51) Int. Cl.
*G06Q 99/00* (2006.01)
(52) U.S. Cl. .................. 705/51; 700/94; 713/168
(58) Field of Classification Search .......... 705/51, 705/52; 700/94; 713/168, 193; 704/278
See application file for complete search history.

(56) References Cited

U.S. PATENT DOCUMENTS

| | | | |
|---|---|---|---|
| 5,579,239 A | 11/1996 | Freeman et al. | |
| 5,610,653 A | 3/1997 | Abecassis | |
| 5,835,087 A | 11/1998 | Herz et al. | |
| 5,899,980 A | 5/1999 | Wilf et al. | |
| 5,970,143 A | 10/1999 | Schneier et al. | |
| 6,222,807 B1 | 4/2001 | Min-Jae | |
| 6,754,636 B1 | 6/2004 | Walker et al. | |
| 7,120,604 B2 * | 10/2006 | Maari ........................ | 705/51 |
| 2001/0010046 A1 | 7/2001 | Muryes et al. | |
| 2001/0049634 A1 | 12/2001 | Stewart | |
| 2001/0049636 A1 | 12/2001 | Hudda et al. | |
| 2002/0038255 A1 | 3/2002 | Tarvydas et al. | |
| 2007/0112449 A1 * | 5/2007 | Moon et al. ................. | 700/94 |

OTHER PUBLICATIONS

Pallab Paul, Marketing on the Internet, 1996, Journal of Consumer Marketing, v13n4, pp. 27-39.*

* cited by examiner

*Primary Examiner*—James P. Trammell
*Assistant Examiner*—Behrang Badii
(74) *Attorney, Agent, or Firm*—Wenderoth, Lind & Ponack, L.L.P.

(57) ABSTRACT

A user terminal program enables a user terminal apparatus to accept instruction information specifying a content that a user wants to reproduce on a predetermined reproducing apparatus other than the user terminal apparatus, and enables acquiring system identifying information to identify a system to receive the specified content from a distributing site. Moreover, the terminal program enables judging whether the acquired system identifying information is included in a compatibility file which includes one or more system identifying information for receiving the specified content according to the system identifying information if the acquired system identifying information is judged to be included, and prohibiting receiving if judged not to be included. Furthermore, the terminal program enables writing the received content to an internal memory or an insertable memory of the predetermined reproducing apparatus.

11 Claims, 6 Drawing Sheets

Fig.2

VERSION NO.: 0004

| DISTRIBUTING PROTOCOL | WRITABLE/UNWRITABLE |
|---|---|
| COMPANY A | WRITABLE |
| COMPANY B | WRITABLE |
| COMPANY C | UNWRITABLE |
| COMPANY D | UNWRITABLE |
| COMPANY E | WRITABLE |
| COMPANY F | WRITABLE |

INFORMAITON ON WRITABLE/UNWRITABLE TO PD

Fig.4

| INSTALLED EMD PLUG-IN | EMD PLUG-IN VERSION |
|---|---|
| COMPANY A PROTOCOL | VERSION 1.0 |
| COMPANY B PROTOCOL | VERSION 1.1 |

INSTALLED EMD PLUG-IN LIST

Fig.5

VERSION NO.: 0002

| DISTRIBUTING PROTOCOL | EMD PLUG-IN DISTRIBUTOR | EMD PLUG-IN VERSION |
|---|---|---|
| COMPANY A | http://www.EMD.com/EMD_A | VERSION 1.0 |
| COMPANY B | http://www.EMD.com/EMD_B | VERSION 1.1 |
| COMPANY C | http://www.EMD.com/EMD_C | VERSION 1.1 |
| COMPANY D | http://www.EMD.com/EMD_D | VERSION 3.1 |
| COMPANY E | http://www.EMD.com/EMD_E | VERSION 1.0 |
| COMPANY F | http://www.EMD.com/EMD_F | VERSION 2.0 |

EMD PLUG-IN DISTRIBUTOR INFORMATION

USER TERMINAL PROGRAM DESIGNATED NOT TO RECEIVE CONTENTS THAT CANNOT ACHIEVE USERS' OBJECT

This application is a divisional of U.S. application Ser. No. 10/111,092, filed Apr. 22, 2002 now abandoned, which is a continuation-in-part under 35 U.S.C. § 120 of U.S. application Ser. No. 09/649,029, filed Aug. 28, 2000 now U.S. Pat. No. 6,336,028.

BACKGROUND OF THE INVENTION

1) Field of Invention

The present invention relates to contents distributing services, and more particularly, to a technique for preventing problems to be caused by differences in systems.

2) Description of the Related Art

In recent years, electronic music distribution (EMD) which sells music contents through the Internet has started to prevail.

There are several EMD service distributors, each using their own distributing systems. For the protection of copyright, each distributed music content is protected to be used (e.g. reproduced or copied) by the software dedicated to its distributing system.

Accordingly, user terminals such as personal computers (PC), in order to purchase music contents using the EMD services, require the dedicated software for each distributing system.

Usually, the dedicated software is provided for free by each company providing EMD services in a plug-in system which is used to add functions to the basic software. The provided software runs on the basic distributing software which is common to a plurality of distributing systems.

On the other hand, portable devices (PD) have appeared on the market which write the music contents purchased on the user terminal to a recording medium or to an internal memory, as well as reproduce the contents.

Currently, there are several types of PDs. For each type of PD, only a limited number of distributing systems can be used to write or reproduce contents. The software unique to a distributing system guarantees that a user can purchase or reproduce a music content on a PC, but does not guarantee that a user can write or reproduce it on a PD.

Therefore, it often happens that users mistakenly purchase music contents that cannot be used on their PDs, against their intention. That is, it happens that the distributing software used for the purchased music contents is not compatible with the PDs of the users, thereby causing problem of not being able to use the purchased contents on their PDs.

If the sold contents are reproducible on the PCs, most EMD distributing companies are not willing to have the sold music contents to be returned, even if it is not reproducible on a particular PD; in the standards of the EMD services, it is considered normal if the product is reproducible on PCs.

Users, then, might go to the makers of the basic distributing software or the makers of the PDs, for complaints and compensations, thinking that they are the ones who are accountable.

This could result in damage to the makers' image and confidence.

Moreover, the reception of unusable music contents, whether for pay or not, results in a waste of line usage fee, provider fee, electricity cost, and user's time, if only a little.

SUMMARY OF THE INVENTION

The object of the present invention, taking this problem into consideration, is to provide a user terminal program, a receiving method, a purchasing method, and a user terminal apparatus, that can prevent reception of contents that are not compatible with the reproducing apparatus of users due to such difference as the distributing system, and that can prevent purchase of products that cannot achieve each user's individual object.

In order to achieve the above object of the present invention, the user terminal program concerning the present invention enables a user terminal apparatus to execute the steps of: an accepting step for accepting, from a user, instruction information specifying a content that the user wants to reproduce on a predetermined reproducing apparatus other than the user terminal apparatus; an acquiring step for acquiring system identifying information which identifies a system to be used for receiving the specified content from a distributing site; a judging step for judging whether the acquired system identifying information is included in a compatibility file which is stored in the user terminal apparatus and which includes one or more pieces of system identifying information identifying each of one or more systems adopted by the predetermined reproducing apparatus; a receiving step for a) receiving the specified content according to the system identified by the acquired system identifying information, if the acquired system identifying information is judged to be included, and b) prohibiting the specified content from being received, if the acquired system identifying information is judged not to be included; and a writing step for writing the received content to a memory of the predetermined reproducing apparatus or to a memory that is insertable into the predetermined reproducing apparatus.

This structure enables judging whether the system identified by the system identifying information is adopted by the predetermined reproducing apparatus, and also enables receiving a content only when its system is adopted by the reproducing apparatus.

Accordingly, the structure enables preventing reception of contents that cannot be reproduced on the predetermined reproducing apparatus, which is against users' intention.

Moreover, the user terminal program of the present invention further enables the user terminal apparatus to execute a warning step for giving the user a warning if the acquired system identifying information is judged not to be included in the compatibility file in the judging step.

This structure enables warning the user when the system identified by the acquired system identifying information is not adopted by the reproducing apparatus.

Accordingly, the user will be notified of the reason why the user terminal apparatus will not receive the content, which will improve the usability.

Moreover, the accepting step, that the user terminal program of the present invention enables the user terminal apparatus to perform, further accepts, from the user, permission to receive the content despite the warning in the warning step. The receiving step further receives the content if the permission is accepted in the accepting step.

This structure enables accepting permission from the user to receive the content despite the warning, and thus enables receiving the content.

Accordingly, users are allowed to receive contents that cannot achieve their original object.

Moreover, the user terminal program of the present invention further enables the user terminal apparatus to execute an updating step for 1) searching a predetermined server for a more recent compatibility file than the compatibility file stored in the user terminal apparatus, and 2) updating the compatibility file stored in the user terminal apparatus by acquiring the more recent compatibility file on a predetermined server, if the more recent compatibility file exists.

This structure enables acquiring a more recent compatibility file if it exists on a predetermined server and enables updating the compatibility file.

Accordingly, the user terminal program can deal with such a situation where a system specified by the acquired system identifying information that was not originally adopted by the predetermined reproducing apparatus is updated to be adopted.

Moreover, the updating step that the user terminal program of the present invention enables the user terminal apparatus to perform, is performed after the accepting step and before the judging step.

This structure enables updating the compatibility information after accepting the user's instruction and before judging whether the system specified by the system identified by the acquired system identifying information is adopted by the predetermined reproducing apparatus.

Accordingly, the user terminal program can always perform judgment based on the latest compatibility file.

Moreover, the updating step that the user terminal program concerning the present invention enables the user terminal apparatus to perform, is performed when the acquired system identifying information is judged not to be included in the compatibility file. In the judging step, the acquired system identifying information is re-judged, using the updated compatibility file if the updating is performed in the updating step.

This structure enables updating the compatibility file when the system identifying information is found not to be adopted by the predetermined reproducing apparatus, and thus enables re-judging using the latest compatibility file when the updating is carried out.

Accordingly, updating can be limited to the fewest times as possible, and system identifying information can be judged correctly based on the latest compatibility information.

Moreover, the user terminal program of the present invention further enables the user terminal apparatus to execute a notifying step for notifying the user of system identifying information in the updated compatibility file if the updating is performed in the updating step. This structure enables notifying users of the latest compatibility file when the updating is performed.

Accordingly, users can be notified of the latest compatibility file, which improves the usability.

Moreover, the updating step that the user terminal program pertaining to the present invention enables the user terminal apparatus to perform, is performed either at the time of starting up the user terminal program or regularly.

This enables updating the compatibility file at the time of starting up the user terminal program, or periodically.

Accordingly, judgment can be based on the latest compatibility file. Moreover, users' waiting time during updating will be eliminated since the updating is to be done beforehand without depending on accepting users' instruction for specifying a content.

Moreover, the user terminal program pertaining to the present invention further comprises one or more receiving plug-ins which are dedicated software to each system and which can add functions, corresponding to each system, to the basic software. The updating step further acquires a receiving plug-in corresponding to each piece of system identifying information added to the compatibility file due to an updating performed in the updating step, before the accepting step for accepting the instruction information.

This structure enables to acquiring the corresponding receiving plug-in to the system identifying information newly-added to the compatibility file before accepting users' instruction.

Accordingly, users' waiting time will be reduced in the acquiring step.

Moreover, the user terminal program pertaining to the present invention further comprises one or more receiving plug-ins which are dedicated software to each system and which can add functions, corresponding to each system, to the basic software. The receiving step includes the following sub-steps: a plug-in existence judging sub-step for judging whether a receiving plug-in corresponding to the acquired system identifying information exists in the user terminal apparatus, if the acquired system identifying information is judged to be included in the judging step; a plug-in acquiring sub-step for acquiring the receiving plug-in from a predetermined distributing site if judged not to exist in the plug-in existence judging sub-step; and an executing sub-step for receiving the content using the receiving plug-in acquired in the plug-in acquiring sub-step.

This structure enables acquiring a receiving plug-in only when the corresponding system is adopted by the predetermined reproducing apparatus and when the corresponding receiving plug-in does not exist in the user terminal.

Accordingly, this structure enables preventing unnecessary reception and memory consumption by avoiding acquisition of unnecessary receiving plug-ins, since it is structured to acquire the required receiving plug-in only when the receiving content is reproducible on the predetermined reproducing apparatus, which is the users' intention.

In order to achieve the above object of the present invention, the user terminal program enables a user terminal apparatus to purchase products from vendor sites, the user terminal apparatus stores purchase information that specifies various types of information either on purchasable products for the user or on non-purchasable products for the user. The user terminal program enables the user terminal apparatus to execute the following steps: an accepting step for accepting, from the user, specifying information specifying a product that the user wants to purchase; an acquiring step for acquiring product information of the specified product in the accepting step; a judging step for judging whether a) the specified product is purchasable for the user or not, or b) the specified product is non-purchasable for the user or not, depending on whether or not the acquired product information and the purchase information match; and a purchasing step for a) purchasing the specified product if judged to be purchasable or if not judged non-purchasable, and b) prohibits purchasing the specified product if not judged purchasable or if judged non-purchasable.

This structure enables judging whether the product is purchasable for the user or not. The user can only purchase product when the product is judged to be purchasable, or when the product is not judged to be non-purchasable.

Accordingly, the structure prevents unnecessary purchase which cannot achieve the user's purchase object.

Moreover, the user terminal program pertaining to the present invention further enables the user terminal apparatus to execute a warning step for giving the user a warning, either when the specified product is not judged purchasable for the user, or when it is judged non-purchasable for the user in the judging step.

This structure enables warning the user when the product is not purchasable for the user, or when the product is non-purchasable.

Accordingly, this structure improves usability by notifying users of the reason why the product cannot be purchased.

Moreover, the accepting step that the user terminal program enables the user terminal apparatus to execute, further accepts, from the user, permission to purchase the product despite the warning in the warning step, and the purchasing step further purchases the product if the permission is accepted in the accepting step.

This structure enables receiving permission from users to purchase, despite the warning. This structure further enables purchasing the content if the permission is received.

Accordingly, the structure provides an alternative, to users, to receive contents that will not achieve users' original object.

In order to achieve the above object of the present invention, a receiving method pertaining to the present invention comprises the steps of: an accepting step for accepting, from a user, instruction information specifying a content that the user wants to reproduce on a predetermined reproducing apparatus other than the user terminal apparatus; an acquiring step for acquiring system identifying information which identifies a system to be used for receiving the specified content from a distributing site; a judging step for judging whether the acquired system identifying information is included in a compatibility file which is stored in the user terminal apparatus and which includes one or more pieces of system identifying information identifying each of one or more systems adopted by the predetermined reproducing apparatus; a receiving step for a) receiving the specified content according to the system identified by the acquired system identifying information, if the acquired system identifying information is judged to be included, and b) prohibiting the specified content from being received, if the acquired system identifying information is judged not to be included; and a writing step for writing the received content to a memory of the predetermined reproducing apparatus or to a memory that is insertable into the predetermined reproducing apparatus.

This structure enables judging whether the system identified by the acquired system identifying information is adopted by the predetermined reproducing apparatus, and also enables receiving a content only when its system is adopted by the reproducing apparatus.

Accordingly, the structure enables preventing reception of contents that cannot be reproduced on the predetermined reproducing apparatus, which is against users' intention.

In order to achieve the above object of the present invention, a purchasing method executed by a user terminal apparatus for purchasing products from vendor sites, where the user terminal apparatus storing purchase information, and where the purchase information specifying various types of information either on purchasable products for the user or on non-purchasable products for the user, the purchasing method comprises the steps of: an accepting step for accepting, from the user, specifying information specifying a product that the user wants to purchase; an acquiring step for acquiring product information of the specified product in the accepting step; a judging step for judging whether a) the specified product is purchasable for the user or not, or b) the specified product is non-purchasable for the user or not, depending on whether or not the acquired product information and the purchase information match; and a purchasing step for a) purchasing the specified product if judged to be purchasable or if not judged non-purchasable, and b) prohibits purchasing the specified product if not judged purchasable or if judged non-purchasable.

This structure enables judging whether the product is purchasable for the user or not. The user can only purchase a product when the product is judged to be purchasable, or when the product is not judged to be non-purchasable.

Accordingly, the structure prevents unnecessary purchase which cannot achieve the user's purchase object.

In order to achieve the above object of the present invention, the user terminal apparatus pertaining to the present invention comprises: a compatibility file storing unit for storing a compatibility file which includes one or more pieces of system identifying information identifying each of one or more systems adopted by a predetermined reproducing apparatus other than the user terminal apparatus; an accepting unit for accepting, from a user, instruction information specifying a content that the user wants to reproduce on the predetermined reproducing apparatus; an acquiring unit for acquiring system identifying information which identifies a system to be used for receiving the specified content from a distributing site; a judging unit for judging whether the acquired system identifying information is included in the compatibility file; a receiving unit for a) receiving the specified content according to the system identified by the acquired system identifying information, if the acquired system identifying information is judged to be included, and b) prohibiting the specified content from being received, if the acquired system identifying information is judged not to be included; and a writing unit for writing the received content to a memory of the predetermined reproducing apparatus or to a memory that is insertable into the predetermined reproducing apparatus.

This structure enables judgment whether the system identified by the acquired system identifying information is adopted by the predetermined reproducing apparatus, and also enables receiving a content only when its system is adopted by the reproducing apparatus.

Accordingly, the structure enables preventing reception of contents that cannot be reproduced on the predetermined reproducing apparatus, which is against users' intention.

In order to achieve the above object of the present invention, the user terminal apparatus pertaining to the present invention comprises: a purchase information storing unit for storing purchase information which specifies various types of information either on purchasable products for a user or on non-purchasable products for the user; an accepting unit for accepting, from the user, specifying information specifying a product that the user wants to purchase; an acquiring unit for acquiring product information of the specified product in the accepting means; a judging unit for judging whether a) the specified product is purchasable for the user or not, or b) the specified product is non-purchasable for the user or not, depending on whether or not the acquired product information and the purchase information match; and a purchasing unit for a) purchasing the specified product if judged to be purchasable or if not judged non-purchasable, and b) prohibits purchasing the specified product if not judged purchasable or if judged non-purchasable.

This structure enables judging whether the product is purchasable for the user or not. The user can only purchase product when the product is judged to be purchasable, or when the product is not judged to be non-purchasable.

Accordingly, the structure prevents unnecessary purchase which cannot achieve the user's purchase object.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings:

FIG. 2 illustrates a compatibility table of a company Q held in a compatibility table holding unit.

FIG. 4 illustrates an example of an EMD plug-in list stored in an EMD plug-in list storage.

FIG. 5 illustrates an example of an EMD plug-in distributor stored in an EMD plug-in distributor storage.

DESCRIPTION OF THE PREFERRED EMBODIMENT(S)

Embodiment

<Overview>

The embodiment of the present invention is to enable a personal computer (PC) to judge whether the music content that a user intends to purchase is usable on the user's portable device (PD) based on a compatibility table. It is designed to give a warning if it considers music content unusable on the PD, which prevents users from purchasing the music content by mistake.

<Construction>

Figure 1:
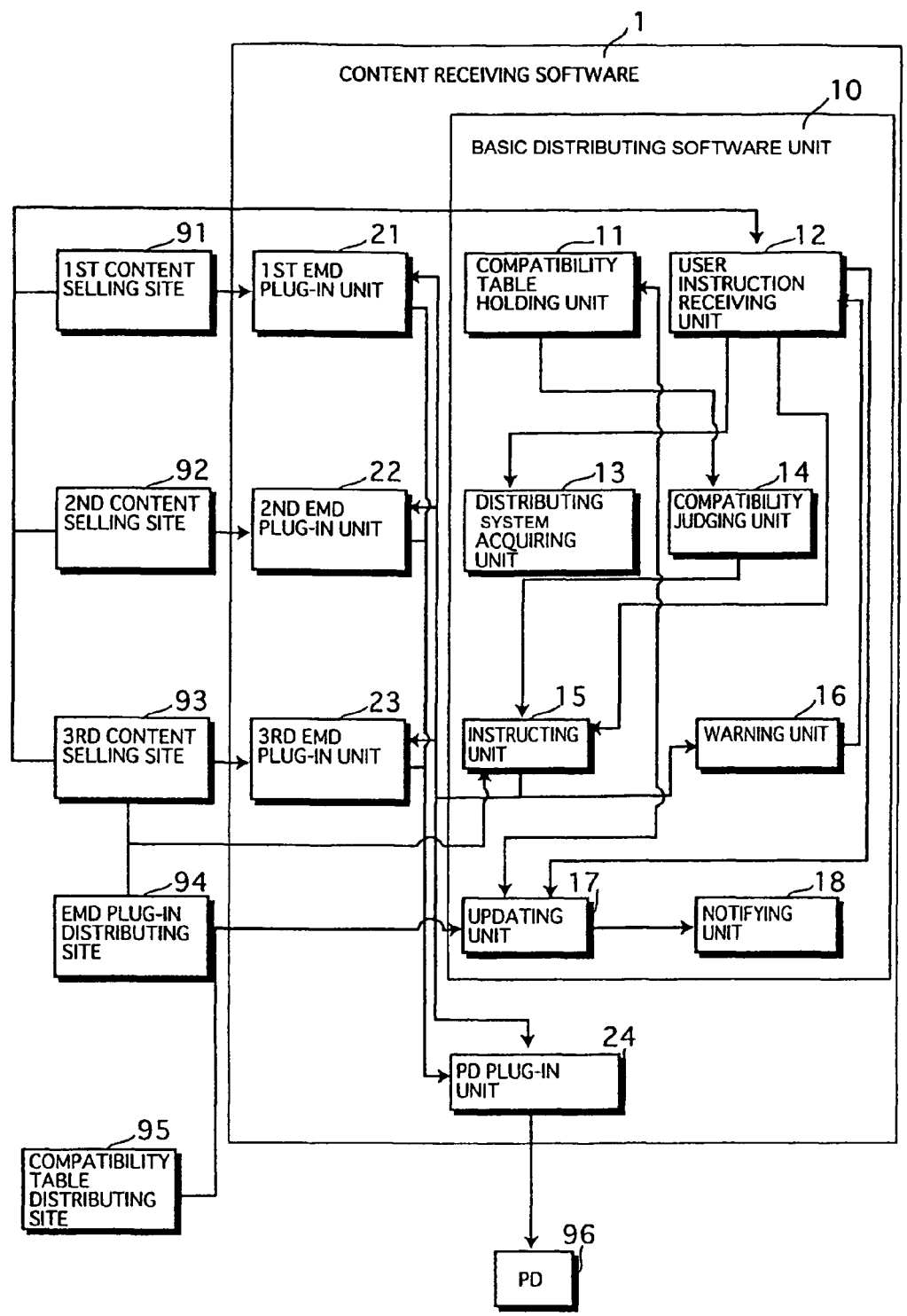
FIG. 1 illustrates a construction of a content receiving software pertaining to the embodiment of the present invention.

FIG. 1 illustrates a construction of the content receiving software 1, pertaining to the embodiment of the present invention.

FIG. 1 depicts a first content selling site 91, a second content selling site 92, a third content selling site 93, an electronic music distribution (EMD) plug-in distributing site 94, a compatibility table distributing site 95, and a PD96.

The first content selling site 91 sells contents according to the distributing system of a company A.

The second content selling site 92 sells contents according to the distributing system of a company B.

The third content selling site 93 not only sells contents according to the distributing system of a company C, but also distributes an EMD plug-in that purchases contents according to the distributing system of the company C and reproduces the purchased contents.

The EMD plug-in distributing site 94 distributes an EMD plug-in which purchases contents according to the distributing system of the company B and also reproduces the purchased contents.

The compatibility table distributing site 95 distributes a compatibility table showing one or more distributing systems that are adopted by a company Q, which is updated either regularly or when necessary.

The PD96 is either a PD of the company Q or a recording medium compatible with the PD of the company Q.

The content receiving software 1 depicted in FIG. 1 consists of a basic distributing software unit 10, a first EMD plug-in unit 21, a second EMD plug-in unit 22, a third EMD plug-in unit 23, and a PD plug-in unit 24.

The basic distributing software unit 10 controls basic actions common to several distributing systems and includes a compatibility table holding unit 11, a user instruction receiving unit 12, a distributing system acquiring unit 13, a compatibility judging unit 14, an instructing unit 15, a warning unit 16, an updating unit 17, and a notifying unit 18.

The first EMD plug-in unit 21 works as an EMD plug-in which purchases contents according to the system of the company A, and reproduces the purchased contents.

Likewise, the second EMD plug-in unit 22 purchases contents according to the system of the company B, and reproduces the purchased contents.

The third EMD plug-in unit 23 purchases contents according to the system of the company C, and reproduces the purchased contents.

The PD plug-in unit 24 is a PD plug-in which writes purchased contents to an internal memory of the PD of the company Q or to a recording medium compatible with the PD of the company Q.

Here, the first EMD plug-in unit 21 and the PD plug-in unit 24 are assumed to be shipped with the content receiving software 1, whereas the second EMD plug-in unit 22 and the third EMD plug-in unit 23 are not and are to be added upon request.

The compatibility table holding unit 11 holds a compatibility table that has one or more distributing systems for each PD maker.

FIG. 2 shows the compatibility table of the company which is held by the compatibility table holding unit 11. FIG. 2 shows that the distributing system of the company Q is adopted by the company A, B, E, and F, whereas not by the company C and D.

The user instruction receiving unit 12 receives, from a user, instruction information specifying a content which the user wants to purchase for the PD96. Specifically, the user selects a content from sales menus in either one of the content selling sites.

The distributing system acquiring unit 13 acquires information on the distributing system of the content specified by the instruction information received by the user instruction receiving unit 12. Specifically, it acquires information identifying the distributing system from the site selling the selected content via the user instruction receiving unit 12. For example, if the user instruction receiving unit 12 receives specification of a content sold by the first content selling site 91, the distributing system acquiring unit 13 acquires information which identifies the distributing system of the company A from the first content selling site 91 via the user instruction receiving unit 12.

The compatibility judging unit 14 judges whether the distributing system identified matches that of the PD96, using the compatibility table of the company Q held by the compatibility table holding unit 11.

When the compatibility judging unit 14 judges that the distributing system matches that of the PD96, the instructing unit 15 instructs the corresponding EMD plug-in to purchase the content, and then instructs the PD plug-in unit 24 to write the purchased content to the internal memory of the PD96 or to the recording medium compatible with the PD96. When judged non-matching, the instructing unit 15 puts the purchase on hold, and orders the warning unit 16 to issue a warning.

Here, there is a possibility that the corresponding EMD plug-in does not exist in the content receiving software 1.

Figure 3:
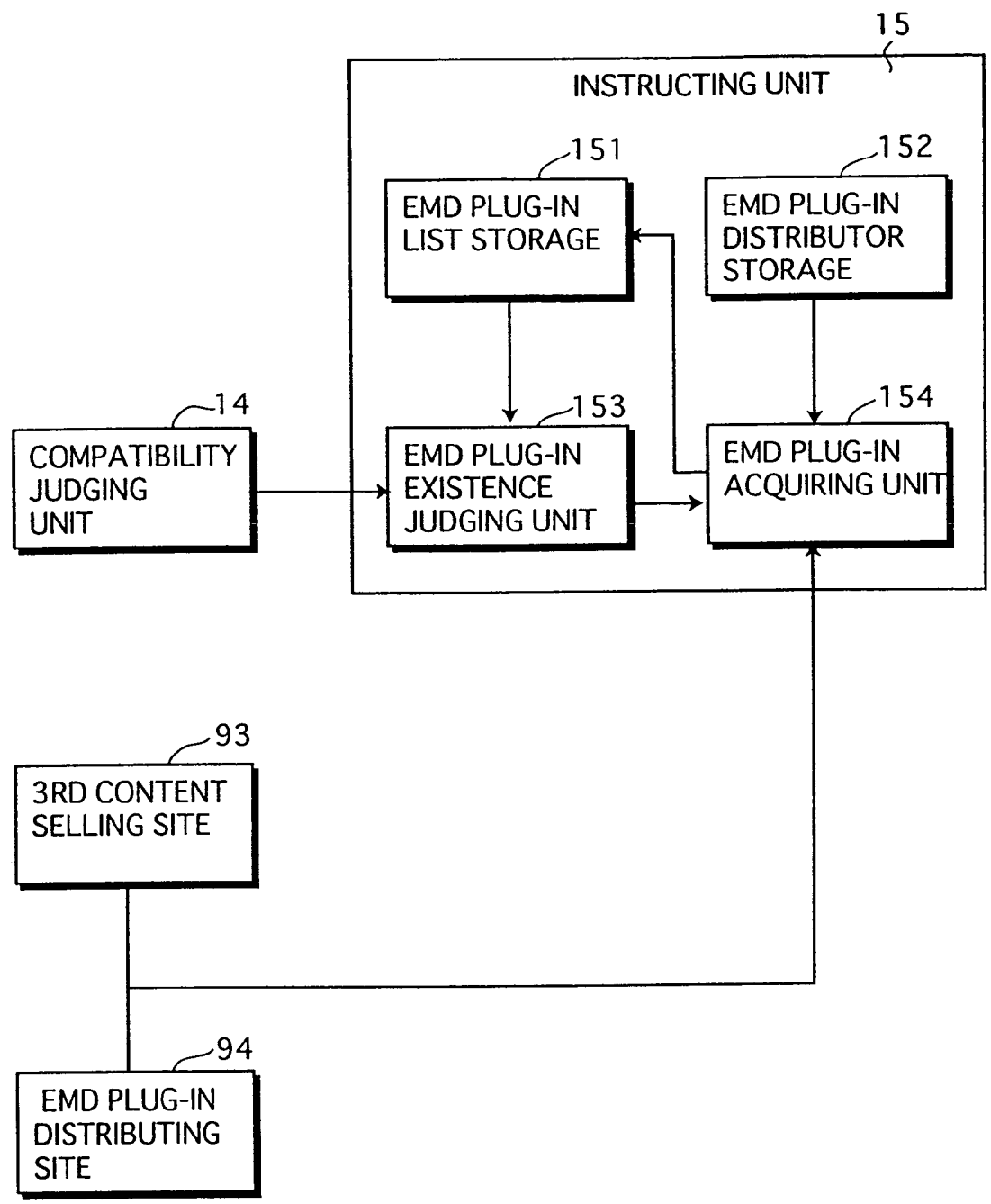
FIG. 3 details a structure of an instructing unit.

FIG. 3 details the instructing unit 15 which is structured to deal with this case.

The instructing unit 15 shown in FIG. 3 includes an EMD plug-in list storage 151, an EMD plug-in distributor storage 152, an EMD plug-in existence judging unit 153, and an EMD plug-in acquiring unit 154.

The EMD plug-in list storage 151 stores an EMD plug-in list having all the versions of EMD plug-in that exist in the content receiving software 1 without being deleted; the EMD plug-ins can either be shipped with the contents receiving software 1, or they can be added later.

FIG. 4 shows an example of the EMD plug-in list stored in the EMD plug-in list storage 151.

The EMD plug-in list in FIG. 4 currently contains a version 1.0 EMD plug-in corresponding to the distributing system of the company A and a version 1.1 EMD plug-in corresponding to the distributing system of the company B.

The EMD plug-in distributor storage 152 stores distributors of EMD plug-ins for each distributing system.

FIG. 5 is an example of EMD plug-in distributors stored in the EMD plug-in distributor storage 152. Specifically it records the URL (uniform resource locator) of the EMD plug-in distributing site for each distributing system.

When the compatibility judging unit 14 confirms a matching, the EMD plug-in existence judging unit 153 judges whether or not the corresponding EMD plug-in exists in the content receiving software 1, using the EMD plug-in list in the EMD plug-in list storage 151 as a reference. If it is judged to exist, the EMD plug-in existence judging unit 153 instructs the EMD plug-in acquiring unit 154 to purchase the content using the EMD plug-in.

When the EMD plug-in existence judging unit 153 judged that the EMD plug-in does not exist, the EMD plug-in acquiring unit 154 acquires the corresponding EMD plug-in, using the EMD plug-in distributors stored in the EMD plug-in distributor storage 152 as a reference, and instructs the acquired EMD plug-in to purchase the content.

In this example, when the EMD plug-in of the company B does not exist, the EMD plug-in acquiring unit 154 acquires the second EMD plug-in unit 22 from the EMD plug-in distributing site 94. Likewise, when the EMD plug-in of the company C does not exist, it acquires the third EMD plug-in unit 23 from the third content selling site 95.

The warning unit 16, when the compatibility judging unit 14 judges that the distributing system whose identifying information is acquired through the distributing system acquiring unit 13 does not match that of the PD96, it warns the user by displaying the following notice on the monitor, "The selected content XXXX cannot be used by your PD. Are you still willing to purchase the product?"

The user instruction receiving unit 12, further receives the permission by the user to purchase the content despite the warning by the warning unit 16.

The instructing unit 15, receiving the permission to purchase the content from the user instruction receiving unit 12, further instructs the corresponding EMD plug-in to purchase the content.

Again, there is a possibility that the corresponding EMD plug-in does not exist in the content receiving software 1.

Ready for such an instance, the instructing unit 15, upon receiving the permission from the user instruction receiving unit 12, first investigates to see if the corresponding EMD plug-in exists in the content receiving software 1. If it is judged non-existent, the instructing unit 15 acquires the corresponding EMD plug-in and instructs the EMD plug-in to purchase the content.

The updating unit 17 investigates to see whether a more recent compatibility table than the one held in the compatibility table holding unit 11 exists. When it exists, then the updating unit 17 acquires the latest table for updating.

Here, the timing when the updating unit 17 updates the compatibility table can be after receiving the instruction information from the user instruction receiving unit 12 and before the compatibility judging unit 14 performs judging. Alternatively, the timing can be right after the judgment of non-compatibility by the compatibility judging unit 14, or it can also be at the time of starting up the user terminal program. Or, regular updating is also possible. Note that when an updating is performed after the non-compatibility judgment, the compatibility judging unit 14 re-investigates to look for the corresponding EMD plug-in in the content receiving software 1, using the latest compatibility table.

When a distributing system by a new company is added to the compatibility table by the updating unit 17, it can be arranged to automatically acquire the EMD plug-in of the newly added distributing system before a purchase order arises, at the time of starting up the user terminal program or regularly, for example. This reduces users' waiting time for acquiring the corresponding EMD plug-in, when they purchase a content according to the added distributing system for the first time.

The notifying unit 18, when the updating unit 17 performed updating, notifies the user of the updated compatibility table.

<Operation>

Figure 6:
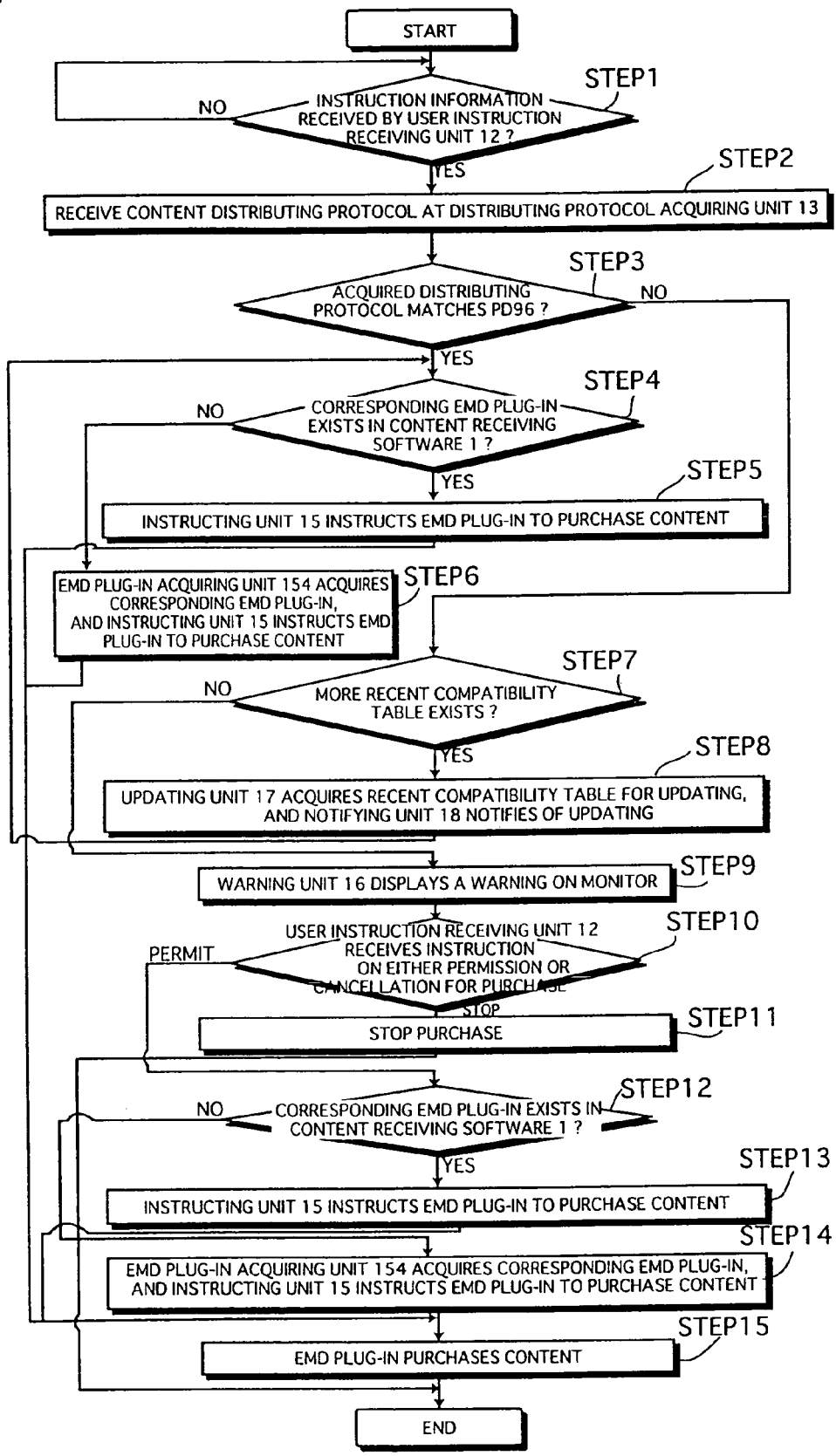
FIG. 6 is a flow chart illustrating content-purchase transactions performed by the content receiving software pertaining to the embodiment of the present invention.

FIG. 6 shows procedural steps by which the content receiving software 1, which is the exemplary embodiment of the present invention, performs purchasing.

Please note that, in this embodiment, an updating of the compatibility table is to be performed right after the compatibility judging unit 14 judges the non-compatibility of the distributing system of the selected content with that of the PD96.

The following is an overview of the steps of the purchase method with reference to FIG. 6.

(1) The user instruction receiving unit 12 waits for receiving instruction information, from the user, specifying the contents to be received for the purpose of using for the PD96 (step S1).

(2) The distributing system acquiring unit 13 acquires identifying information on the distributing system which corresponds to the specified contents by the user instruction receiving unit 12 (step S2).

(3) The compatibility judging unit 14 judges whether the distributing system whose information is acquired by the distributing system acquiring unit 13 matches that of the PD96 (step S3).

(4) If the compatibility was confirmed by the compatibility judging unit 14 (step S3:Yes), the EMD plug-in existence judging unit 153 judges whether the corresponding EMD plug-in exists in the content receiving software 1, using the EMD plug-in list stored in the EMD plug-in list storage 151 as a reference(step S4).

(5) When the existence of the corresponding EMD plug-in was confirmed by the EMD plug-in existence judging unit 153 (step S4:Yes), the instructing unit 15 instructs the EMD plug-in to purchase the content (step S5).

(6) When the non-existence of the corresponding EMD plug-in was confirmed by the EMD plug-in existence judging unit 153 (step S4:No), the EMD plug-in acquiring unit 154 acquires the corresponding EMD plug-in, using the EMD plug-in distributor information stored in the EMD plug-in distributor storage 152 as a reference. Then, the instructing unit 15 instructs the EMD plug-in to purchase the contents (step S6).

(7) When the compatibility judging unit 14 judged non-compatibility (step S3:No), the updating unit 17 investigates in the compatibility table distributing site 95, to see whether a more recent compatibility table than the one held by the compatibility table holding unit 11 exists (step S7).

(8) When the more recent compatibility table exists (step S7:Yes), the updating unit 17 acquires this table for updating, and the notifying unit 18 notifies the user of the updated compatibility table. Then the transaction returns to step S4 in which the judgment is performed as to whether the corresponding EMD plug-in exists (step S8)

(9) When the more recent compatibility table does not exist (step S7:No), the warning unit 16 warns the user by displaying the following message on the monitor, "The selected content XXXX cannot be used by your PD. Are you still willing to purchase the product?" (step S9)

(10) The user instruction receiving unit 12 receives a user instruction on either permission of purchase despite the warning by the warning unit 16, or a cancellation of purchase transaction(step S10).

(11) When a user instruction on a cancellation of purchase is received (step S10:stop), it cancels the transaction to purchase the content (step S11).

(12) When a user instruction on permission of purchase is received (step S10:permit), the EMD plug-in existence judging unit 153 investigates in the content receiving software 1 to search for the corresponding EMD plug-in, using the EMD plug-in list stored on the EMD plug-in list storage 151 (step S12).

(13) When the corresponding EMD plug-in was judged to exist by the EMD plug-in existence judging unit 153 (step S12:Yes), the instructing unit 15 instructs the EMD plug-in to purchase the content (step S13).

(14) When the corresponding EMD plug-in was judged not to exist by the EMD plug-in existence judging unit 153 (step S12:No), the EMD plug-in acquiring unit 154 acquires the corresponding EMD plug-in, using the EMD plug-in distributors stored on the EMD plug-in distributor storage 152, and then the instructing unit 15 instructs the EMD plug-in to purchase the content (step S14).

(15) The EMD plug-in, upon receipt of the instruction, purchases the content (step S15).

Example 1

The following is an example of purchase transaction where a user purchases a content for the PD96 according to the distributing system of the company A from the purchase home page of the first content selling site 91.

In the step S1, the user instruction receiving unit 12 receives, from the user, an instruction to purchase a content for the PD96 through the first content selling site 91.

In the step S2, the distributing system acquiring unit 13 acquires, from the first content selling site 91, information identifying the distributing system of the content of the user's choice, which is that of the company A in this example.

In the step S3, the compatibility judging unit 14 judges that the distributing system of the company A matches that of the PD96, based on the compatibility table by the company Q as shown in FIG. 2, then control moves on to the step S4.

In the step S4, the EMD plug-in existence judging unit 153 judges that the first EMD plug-in unit 21 which corresponds to the distributing system of the company A exists, then control is passed to the step S5.

In the step S5, the instructing unit 15 instructs the first EMD plug-in unit 21 to purchase the content, then control goes to the step S15.

In the step S15, the first EMD plug-in unit 21, upon receiving the instruction, purchases the content and completes the transaction.

Example 2

The second example is where a user purchases a content for the PD96 according to the distributing system of the company B through the purchase home page of the second content selling site 92.

In the step S1, the user instruction receiving-unit 12 receives, from the user, an instruction to purchase a content for the PD96 from the second content selling site 92.

In the step S2, the distributing system acquiring unit 13 acquires information specifying the distributing system of the content of the user's choice from the second content selling site 92, which is, in this second example, that of the company B.

In the step S3, the compatibility judging unit 14 judges that the distributing system of the company B matches that of the PD96 based on the compatibility table of the company Q as shown in FIG. 2, then control is passed to the step S4.

In the step S4, the EMD plug-in existence judging unit 153 judges non-existence of the corresponding EMD plug-in to the distributing system of the company B, and control goes to the step S6.

In the step S6, the EMD plug-in acquiring unit 154 acquires the second EMD plug-in unit 22 from the EMD plug-in distributing site 94, using the EMD plug-in distributors as a reference, and the instructing unit 15 instructs the second EMD plug-in unit 22 to purchase the content, then control is passed to the step S15.

In the step 15, upon receiving the instruction, the second EMD plug-in unit 22 purchases the content and finishes the purchase transaction.

Example 3

The third example describes a case where a user whose initial intention is to purchase a content for the PD96 according to the distributing system of the company C through the purchase home page of the third content selling site 93, cancels this purchase transaction since the distributing system of the company C does not match that of the PD96.

In the step S1, the user instruction receiving unit 12 receives, from the user, an instruction to purchase a content for the PD96 from the third content selling site 93.

In the step S2, the distributing system acquiring unit 13 acquires information identifying the distributing system of the content of the user's choice, which is in this case the distributing system of the company C, from the third content selling site 93.

In the step S3, the compatibility judging unit 14 judges that the distributing system of the company C does not match that of the PD96 based on the compatibility table of the company Q as shown in FIG. 2, then control moves on to the step S7.

In the step S7, the updating unit 17 investigates to see whether a more recent compatibility table exists on the compatibility table distributing site 95. If so, updating is performed in the step S8, and control returns to the step S3. In this example, a more recent compatibility table is assumed not to exist, and control goes to the step S9.

In the step S9, the warning unit 16 warns the user by showing the following message on the monitor, "The selected content XXXX cannot be used by your PD. Are you still willing to purchase the product?"

In the step S10, a user instruction on the cancellation of the purchase is received.

In the step S11, the transaction for the purchase of the content is cancelled.

As seen from the above, the content receiving software pertaining to the embodiment of the present invention gives a warning when the content of a user's choice is not usable on the PD of the user, which prevents users from purchasing the content by mistake.

Note that, in the present embodiment, only contents that are not usable on the user's PD are the object of being prevented from being purchased. However, this invention is applicable to any products other than contents.

In such a case, a product purchasing software is substituted for the content receiving software of the exemplary embodiment, and each of the following constituting elements are substituted for the components in the exemplary embodiment.

For the compatibility table holding unit 11, a purchase information holding unit is substituted. In this unit, either items which the user may purchase, or items which the user may not, are held.

For example, purchase information includes the following: the user may purchase electrical appliances whose mains frequency is 50 hertz; the user may purchase game software for the game machine A; and the user may not purchase products of the company X, etc.

The user instruction unit 12 receives, from the user, product specifying information that specifies the product of the user's choice.

The distributing system acquiring unit 13 is replaced by a product information acquiring unit which acquires product information on the product of the user's choice, which is specified by the instruction information received by the user instruction receiving unit 12, instead of by the distributing system in the embodiment.

For example, the product information includes such as the mains frequency of the electrical appliance, the product name of the game machine for the game software, and the maker of the product.

The compatibility judging unit 14 judges whether the user can purchase the product or not, based on whether or not the product information acquired from the product information acquiring unit matches the purchase information held in the purchase information holding unit.

The instruction unit 15 instructs to purchase the product, if the compatibility judging unit 14 judges that the product of the user's choice is purchasable for the user. If the product is not judged to be purchasable for the user, the compatibility judging unit 14 puts the product purchase on hold. And if the product is not judged to be purchased (non-purchasable) for the user, it instructs to purchase the product, and if it is judged to be non-purchasable, then the compatibility judging unit 14 puts the purchase of the product on hold.

The warning unit 16 gives a warning after receiving the instruction by the instructing unit 15, in both cases where the compatibility judging unit 14 does not judge that the user may purchase the product, and where it judges that the user may not purchase the product.

The user instruction receiving unit 12 further receives permission, from the user, to purchase the product despite the warning by the warning unit 16.

The instructing unit 15 further instructs to purchase the product, upon receiving the permission from the user instruction receiving unit 12.

As seen from the above, the product purchasing software is made to warn users when they attempt to purchase products other than what they may purchase, and when they try to purchase what they may not purchase. This greatly helps prevent mistaken purchases.

INDUSTRIAL APPLICABILITY

The present invention is applicable to such a case that a user instructs a purchase, from the apparatus of the user, to another apparatus, such as where a user purchases contents sold on the Web site from the user terminal. The present invention enables a user, before making a decision to purchase a product, to judge whether the product of the user's choice can achieve the purchase object of the user that is out of functions guaranteed by the seller. This helps prevent mistaken purchases.

This invention is further capable of preventing users from purchasing products that do not match each user's taste, liking, and other individual circumstances, by enabling the registration of the information beforehand, such as product name, brand name, function, and quality that users may either purchase or may not purchase. Thereby, enabling judgment by the users, before the purchase, whether the product can achieve the individual purchase object for each user.

What is claimed is:

1. A user terminal program recorded on a computer-readable recording medium of a user terminal apparatus, wherein:

the user terminal apparatus has pre-stored therein a compatibility file used as a basis for judging compatibility between a specified content that a user wants to purchase and a predetermined reproducing apparatus other than the user terminal apparatus, the compatibility file includes one or more pieces of system identifying information each identifying (i) a purchasing system for purchasing the specified content and (ii) a reproducing system for reproducing the purchased specified content, the purchasing and reproducing systems being adopted by the predetermined reproducing apparatus, and the specified content, which is distributed according to the purchasing and reproducing systems identified by the corresponding system identifying information, is written to one of a memory of the predetermined reproducing apparatus and a memory that is insertable into the predetermined reproducing apparatus, said user terminal program enables the user terminal apparatus to execute at least the following steps:

accepting, from a user, instruction information specifying the specified content that the user wants to reproduce on the predetermined reproducing apparatus;

acquiring system identifying information which identifies a system to be used for receiving the specified content from a distributing site;

judging whether the acquired system identifying information is included in the compatibility file, to judge whether the specified content can be reproduced on the predetermined reproducing apparatus if the specified content corresponding to the acquired system identifying information is purchased and written to one of the memory of the predetermined reproducing apparatus and the memory that is insertable into the predetermined reproducing apparatus;

receiving from the distributing site the specified content that is judged to be reproducible on the predetermined reproducing apparatus when a result of the judgment in said judging operation is affirmative, and prohibiting reception of the specified content from the distributing site when the result of the judgment in said judging operation is negative, the specified content being judged to be non-reproducible on the predetermined reproducing apparatus; and writing the specified content, which has been judged in said judging operation to be reproducible on the predetermined reproducing apparatus, to one of the memory of the predetermined reproducing apparatus and the memory that is insertable into the predetermined reproducing apparatus.

2. The user terminal program of claim 1, further enabling the user terminal apparatus to execute the following step:

giving the user a warning indicating that the special content cannot be used on the predetermined reproducing apparatus when the result of the judgment in said judging operation is negative.

3. The user terminal program of claim 2, wherein said accepting operation further accepts, from the user, permission to receive the specified content despite the warning, and wherein said receiving operation further receives the specified content if the permission is accepted in said accepting operation.

4. The user terminal program of claim 1, further enabling the user terminal apparatus to execute the following steps:

searching a predetermined server for a more recent compatibility file than the compatibility file stored in the user terminal apparatus, and updating the compatibility file by acquiring the more recent compatibility file, if the more recent compatibility file exists.

5. The user terminal program of claim 4, wherein said searching and updating operations are performed after said accepting operation and before said judging operation.

6. The user terminal program of claim 4, wherein said searching and updating operations are performed when the acquired system identifying information is judged not to be included in the compatibility file, and wherein in said judging operation, the acquired system identifying information is judged again, using the updated compatibility file if said searching and updating operations are performed.

7. The user terminal program of claim 4, further enabling the user terminal apparatus to execute the following step:

notifying the user of system identifying information in the updated compatibility file if said searching and updating operations are performed.

8. The user terminal program of claim 7, wherein said searching and updating operations are performed either at a time of starting up the user terminal program or periodically.

9. The user terminal program of claim 8, further comprising at least one receiving plug-in which is dedicated software for each system and which can add functions corresponding to each system to said user terminal program, wherein said searching and updating operations further acquire a receiving plug-in corresponding to each piece of system identifying information added to the compatibility file due to said searching and updating operations, before said accepting operation.

10. The user terminal program of claim 1, further comprising at least one receiving plug-in which is dedicated software for each system and which can add functions corresponding to each system to said user terminal program, and wherein said receiving operation includes the following:

determining whether a receiving plug-in corresponding to the acquired system identifying information exists in the user terminal apparatus, if the acquired system identifying information is judged to be included in said judging operation;

obtaining the receiving plug-in from a predetermined distributing site if the receiving plug-in corresponding to the acquired system identifying information is determined not to exist in said determining operation; and receiving the specified content using the receiving plug-in obtained in the said obtaining operation.

11. A receiving method executed by a user terminal apparatus, wherein:

a user terminal apparatus has pre-stored therein a compatibility file used as a basis for judging compatibility between a specified content that a user wants to purchase and a predetermined reproducing apparatus other than the user terminal apparatus, the compatibility file includes one or more pieces of system identifying information each identifying (i) a purchasing system for purchasing the specified content and (ii) a reproducing system for reproducing the purchased specified content, the purchasing and reproducing systems being adopted by the predetermined reproducing apparatus, and the specified content, which is distributed according to the purchasing and reproducing systems identified by the corresponding system identifying information, is written to one of a memory of the predetermined reproducing apparatus and a memory that is insertable into the predetermined reproducing apparatus, said receiving method comprising:

accepting, from a user, instruction information specifying the specified content that the user wants to reproduce on the redetermined reproducing apparatus;

acquiring system identifying information which identifies a system to be used for receiving the specified content from a distributing site;

judging whether the acquired system identifying information is included in the compatibility file, to judge whether the specified content can be reproduced on the predetermined reproducing apparatus if the specified content corresponding to the acquired system identifying information is purchased and written to one of the memory of the predetermined reproducing apparatus and the memory that is insertable into the predetermined reproducing apparatus;

receiving from the distributing site the specified content that is judged to be reproducible on the predetermined reproducing apparatus when a result of the judgment in said judging operation is affirmative, and prohibiting reception of the specified content from the distributing site when the result of the judgment in said judging operation is negative, the specified content being judged to be non-reproducible on the predetermined reproducing apparatus; and writing the specified content, which has been judged in said judging operation to be reproducible on the predetermined reproducing apparatus, to one of the memory of the predetermined reproducing apparatus and the memory that is insertable into the predetermined reproducing apparatus.

* * * * *